(12) United States Patent
Wiklinska et al.

(10) Patent No.: US 10,394,236 B2
(45) Date of Patent: Aug. 27, 2019

(54) VEHICLE SYSTEM AND METHOD FOR ENABLING A DEVICE FOR AUTONOMOUS DRIVING

(71) Applicant: ZF Friedrichshafen AG, Friedrichshafen (DE)

(72) Inventors: Malgorzata Wiklinska, Markdorf (DE); Matthias Holzer, Frickingen (DE); Gerhard Deuter, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 64 days.

(21) Appl. No.: 15/292,443

(22) Filed: Oct. 13, 2016

(65) Prior Publication Data

US 2017/0108864 A1  Apr. 20, 2017

(30) Foreign Application Priority Data

Oct. 16, 2015 (DE) .......................... 10 2015 220 237

(51) Int. Cl.
*B60W 40/08* (2012.01)
*G05D 1/00* (2006.01)
(Continued)

(52) U.S. Cl.
CPC .......... *G05D 1/0061* (2013.01); *B60K 28/06* (2013.01); *B60W 40/08* (2013.01);
(Continued)

(58) Field of Classification Search
CPC ..... G05D 1/0061; B60K 28/06; B60W 40/08; B60W 50/0098; G06K 9/00302; G06K 9/00832; G06N 5/022; H04N 7/183
See application file for complete search history.

(56) References Cited

U.S. PATENT DOCUMENTS

| 7,639,148 B2 * | 12/2009 | Victor .................... B60K 28/06 340/439 |
| 9,043,956 B2 | 6/2015 | Baumgarten et al. |
| 2006/0149428 A1 | 7/2006 | Kim et al. |
| 2008/0284615 A1 | 11/2008 | Tauchi et al. |

(Continued)

FOREIGN PATENT DOCUMENTS

| DE | 10 2005 058 227 A1 | 7/2006 |
| DE | 10 2012 111 253 A1 | 5/2014 |

(Continued)

OTHER PUBLICATIONS

Gao et al., "Detecting Emotional Stress from Facial Expressions for Driving Safety", Signal Processing Laboratory (LTS5), École Polytechnique Fédérale de Lausanne, Switzerland, 2014.

*Primary Examiner* — Anshul Sood
(74) *Attorney, Agent, or Firm* — David & Bujold PLLC; Michael J. Bujold

(57) ABSTRACT

A vehicle system of a vehicle for a vehicle user having a camera, an evaluation unit which has a memory and is coupled to the camera, a communication device that is coupled to the evaluation unit, and a self-drive unit which is coupled to the evaluation unit for autonomously driving the vehicle. The camera views the face of the vehicle user and relays collected data to the evaluation unit. An artificial intelligence, in the evaluation unit, evaluates the data from the camera in relation to the attentiveness and emotion of the vehicle user. The evaluated data is stored in the memory of the evaluation unit. On the basis of a predetermined emotion or a lack of attentiveness of the vehicle user, recognized by the artificial intelligence, the vehicle user is notified of the emotion or the lack of attentiveness recognized and the self-drive unit can be activated.

11 Claims, 1 Drawing Sheet

(51) Int. Cl.
    *G06N 5/02*       (2006.01)
    *G06K 9/00*       (2006.01)
    *H04N 7/18*       (2006.01)
    *B60W 50/00*     (2006.01)
    *B60K 28/06*     (2006.01)
    *B60R 11/04*     (2006.01)
    *B60W 50/14*     (2012.01)
    *G06N 3/00*       (2006.01)

(52) U.S. Cl.
    CPC ..... *B60W 50/0098* (2013.01); *G06K 9/00302* (2013.01); *G06K 9/00832* (2013.01); *G06N 5/022* (2013.01); *H04N 7/183* (2013.01); *B60R 11/04* (2013.01); *B60W 50/14* (2013.01); *B60W 2040/0818* (2013.01); *B60W 2050/0075* (2013.01); *B60W 2050/0095* (2013.01); *B60W 2420/42* (2013.01); *G06N 3/006* (2013.01)

(56) References Cited

U.S. PATENT DOCUMENTS

| | | | | |
|---|---|---|---|---|
| 2010/0134302 | A1* | 6/2010 | Ahn | A61B 5/165 340/576 |
| 2012/0271484 | A1* | 10/2012 | Feit | B60W 30/09 701/1 |
| 2015/0066284 | A1* | 3/2015 | Yopp | B60W 30/00 701/29.2 |
| 2015/0142244 | A1* | 5/2015 | You | G01C 21/00 701/23 |

FOREIGN PATENT DOCUMENTS

| | | |
|---|---|---|
| DE | 10 2014 204 980 A1 | 1/2015 |
| DE | 10 2013 021 816 A1 | 6/2015 |
| DE | 10 2013 021 869 A1 | 6/2015 |
| EP | 2 711 227 A1 | 3/2014 |
| WO | 2014/121182 A1 | 8/2014 |

* cited by examiner

VEHICLE SYSTEM AND METHOD FOR ENABLING A DEVICE FOR AUTONOMOUS DRIVING

This application claims priority from German patent application serial no. 10 2015 220 237.2 filed Oct. 16, 2015.

FIELD OF THE INVENTION

The present invention concerns a vehicle system of a vehicle for at least one vehicle user and a process for activating a self-drive unit for autonomous driving.

BACKGROUND OF THE INVENTION

Autonomously driving vehicles can in certain situations bring a vehicle user to his destination more safely than could the vehicle user when driving himself. Usually, the autonomous driving mode is initiated by the vehicle user before beginning to drive or during driving. However, if the driver is not able to activate autonomous driving or does not realize that it would be safer to drive autonomously, there is a greater risk of accident.

From DE 102013021816 A1 a process is known for providing a function for a motor vehicle. The function is installed in at least one control module of the motor vehicle and is enabled, so that during the operation of the motor vehicle it can be initiated independently and automatically depending on the situation. A user of the motor vehicle is informed automatically about this and invited to approve the activation of the function.

From DE 102013021869 A1 a process is known for providing a function for a motor vehicle. The function is installed in a control module of the motor vehicle. The function is enabled for a first user, whereas the function is enabled for a second user by the first user for at least one use with the motor vehicle by way of a remote access.

From DE 102014204980 A1 a process is known for the automatic limitation or forced activation of certain functions of a motor vehicle, depending on personal data unambiguously associated with a personal electronic vehicle key which confirms to the vehicle electronic system that its owner is a driver authorized to drive the motor vehicle.

From WO 14121182 A1 it is known to detect the way that a driver of a vehicle is feeling. By means of sensors it is detected, for example, whether the driver is under stress, and the vehicle reacts to the specific emotional conditions of the driver.

From EP 2711227 A1 a process, a system and a vehicle having the system are known, for measuring a physiological property of a driver and adapting the control of a transmission accordingly. In this case the stress condition of the driver is determined. If the stress level is high, measures for calming the driver down are set in hand.

From DE 102012111253 A1 a process is known for operating an agricultural machine. The emotional condition of the operator during his operation of the machine is recognized by way of at least one interface with the working machine. The operating mode of the working machine is adapted to the emotional condition of its operator.

From US 2008284615 AA a display system for a vehicle is known, by means of which a driver can be entertained if the vehicle is stuck in traffic. The information to be displayed is chosen to match the driver's feelings, which can be determined from his facial expression.

From DE 102005058227 A1 an emotion-based software robot for automobiles is known.

In addition, from a publication by the Écoke Polytechnique Fédérale de Lausanne a process is known, by means of which stress in a driver of a vehicle can be determined from a facial recognition process.

SUMMARY OF THE INVENTION

Starting from this prior art, the purpose of the present invention is to propose a vehicle system for a vehicle, for at least one vehicle user, which can determine an emotional condition of the vehicle user and, on the basis of that emotional condition, can emit recommendations for the vehicle user. The recognition of the vehicle user's emotional condition takes place in such manner that it is not perceived as annoying by the vehicle user. In order to increases road safety, the driver should be prevented from driving in critical emotional conditions. In addition, for every determinable emotion a particular vehicle function should be controlled in order to influence the vehicle user's emotional condition in a positive way, again so as to increases road safety.

Starting from the objective described above, the present invention proposes a vehicle system of a vehicle for at least one vehicle user and a process for activating a self-drive unit for the autonomous driving of a vehicle having a vehicle system as described below.

A vehicle system of a vehicle for at least one vehicle user comprises a camera arranged inside the vehicle, an evaluation unit which contains a memory and is coupled to the camera, a communication device coupled to the evaluation unit, and a self-drive unit which is coupled to the evaluation unit and by means of which the vehicle can be driven autonomously. The camera is directed toward the vehicle user, views his face and passes this data on to the evaluation unit. By means of an artificial intelligence the evaluation unit evaluates the camera data in relation to the vehicle user's attentiveness and emotions. The evaluated data is stored in the memory of the evaluation unit. On the basis of a predetermined emotion recognized by the artificial intelligence or from the vehicle user's lack of attentiveness as recognized by means of the artificial intelligence, the vehicle user is informed about the emotion or lack of attentiveness recognized and the self-drive unit can be activated.

In this case the camera is arranged in the inside space of the vehicle in such manner that it can view the vehicle user's face at all times. Thus, while driving the vehicle user's face is observed without interruption. The camera compensates for brightness variations inside the vehicle in order to avoid erroneous results of the data evaluation. The camera is coupled to the evaluation unit. This means that data exchange can take place between the camera and the evaluation unit. The coupling can be either by way of a cable, or by wireless means. For example the coupling can take place by way of a radio standard, a wireless communication network (e.g., Bluetooth), infra-red, a wireless personal area network (e.g., ZigBee), W-Lan, etc.

The evaluation unit comprises a memory. The camera data can be stored intermediately in this memory. The camera data is evaluated by the evaluation unit by means of an artificial intelligence. The artificial intelligence is part of the evaluation unit. The evaluated camera data is stored in the memory. Needless to say, the evaluation unit has sufficient computing capacity for the artificial intelligence to be able to evaluate the camera data in real time. Assessment data is also stored in the memory, which is compared with the evaluated data.

The vehicle system also comprises a communication device. With this communication device the vehicle comprising the vehicle system can communicate with other vehicles, which also comprise vehicle systems. The communication takes place by wireless means, for example by way of a radio standard, a wireless communication network (e.g., Bluetooth), infra-red, a wireless personal area network (e.g., ZigBee), W-Lan, etc., or by way of cables. In addition the vehicle system can communicate by way of its communication device with a mobile terminal, for example with a Smartphone, a tablet or some comparable mobile terminal. The communication device is coupled to the evaluation unit. This coupling can take place either by way of a cable or by wireless means. Data exchange between the communication device and the evaluation unit takes place by virtue of the coupling.

Furthermore, the vehicle system comprises the self-drive unit. By means of this self-drive unit, the vehicle comprising the vehicle system can when necessary drive itself, i.e. drive autonomously. The self-drive unit is not permanently activated, i.e. if he chooses the driver can control the vehicle himself, or allow the vehicle to drive autonomously. To be able to determine a suitable time for the self-drive unit to take over control of the vehicle or for control to revert from the self-drive unit back to the vehicle user, the artificial intelligence of the evaluation unit is used. The self-drive unit is coupled to the evaluation unit by wireless means or by way of a cable.

By means of the artificial intelligence, the evaluation unit evaluates the camera data in relation to the attentiveness and emotions of the vehicle user. This means that the camera data, which contains the recorded face of the vehicle's user, is evaluated with the help of the artificial intelligence. The artificial intelligence carries out a face recognition process, confirms the identity of the vehicle user, and determines from the facial expressions of the vehicle's user his predominant emotional condition. For example, the artificial intelligence can distinguish between anger, happiness, surprise, anxiety, boredom, grief, revulsion, stress, fatigue and a neutral facial expression.

The artificial intelligence can also determine a level of attentiveness of the driver from his eye movements and line of sight. The level of attentiveness is determined with reference to a databank stored in the memory of the evaluation unit and the current camera data. The data in the databank and the current evaluated camera data is compared with one another so that a predetermined attentiveness range can be identified as a lack of attentiveness. The evaluated data is stored in the memory of the evaluation unit. In this way an attentiveness variation or an emotional variation can be recognized. For example, the vehicle user's attention may lapse for a short time or he may grimace for a short time, which should not yet lead to a reaction of the vehicle. But if the lack of attention or a particular emotion persists for a predetermined period stored in the memory of the evaluation unit, then a vehicle reaction is triggered.

On the basis of a predetermined emotion recognized by the artificial intelligence or a lack of the vehicle user's attentiveness recognized by the artificial intelligence, the self-drive unit can be activated. The self-drive unit is activated automatically by the evaluation unit, which controls the self-drive unit, or if the vehicle user himself activates the self-drive unit. The self-drive unit is only activated if a predetermined emotion of the vehicle user, or a vehicle user's inattentiveness, persist for a certain period. For example, if for the predetermined period the vehicle user remains angry, tired or stressed, or if he remains inattentive for the period, the vehicle user is notified of his emotional condition or his inattentiveness. That information is conveyed for example by messages in a display or by an acoustic or tactile signal. Thereafter, the self-drive unit takes control of the vehicle either automatically or if the vehicle user activates it. The vehicle user can then no longer control the vehicle himself, and driving is continued by the self-drive unit. This is advantageous, since the vehicle user's journey can continue safely even if he himself is no longer in a position to drive the vehicle safely. This avoids the danger that vehicle users not competent to drive will drive the vehicle and cause accidents.

In an embodiment the evaluation unit of the vehicle system is coupled to an electronic entertainment and diversion system comprised in the vehicle, this electronic entertainment system being activated starting from when a predetermined emotion or a lack of the vehicle user's attentiveness is recognized by the artificial intelligence. The electronic entertainment system can be permanently built into the vehicle or it can be mobile, for example a mobile terminal, that can be coupled to the vehicle by cable or by wireless means. If a predetermined emotion, or inattentiveness, is recognized by the artificial intelligence of the evaluation unit, the electronic entertainment system is activated by the evaluation unit.

In this context particular emotions are linked to particular entertainment options. For example, if the artificial intelligence recognizes that for a predetermined period the vehicle user has not been happy, or that he has been depressed or worried, the electronic entertainment system is activated and for example the type of music preferred by the vehicle user is played in order to cheer him up. Or for example, if the artificial intelligence detects that for a predetermined period the vehicle user has been angry, then music, for example of a soothing type, can be played. If the artificial intelligence detects that for a predetermined period the vehicle user has been tired, then for example music can be played to rouse the vehicle user, or a recommendation can be made to the vehicle user to take a rest-break. Or for example, if the artificial intelligence detects that for a predetermined period the vehicle user has been bored, then the electronic entertainment system proposes to the vehicle user ways or options for diverting himself. If the vehicle is under the control of the self-drive unit, then for example a film can be played. In addition, by means of the electronic entertainment system the evaluation unit can generate an "emotion barometer" which shows the emotional condition of the vehicle user at the time.

In a further embodiment, starting from when the artificial intelligence recognizes that the vehicle user is inattentive, or is under stress or tired, a warning can be issued to the vehicle user. The warning is in the form of a visual and/or acoustic and/or tactile signal, for example an announcement, a display or a vibration. This warning is issued before the self-drive unit takes over control. Preferably, the warning is issued first to the vehicle user. If thereafter the artificial intelligence, within a predetermined period, does not detect from the camera data any increase of attentiveness or reduction of stress or of fatigue, the self-drive unit can be activated. Alternatively a further warning can be issued and the self-drive unit only then activated. In addition a warning can be issued to the vehicle user if a driver-assistance system such as a blind-spot assist or distance sensors detect an impending problematic situation.

According to a further embodiment, starting from when the artificial intelligence detects that the vehicle user is attentive the self-drive unit can be deactivated. If the vehicle is driving autonomously because the self-drive unit has been activated, control of the vehicle can be returned to the vehicle user when the latter is seen to be sufficiently attentive. In other word the vehicle user can only take over control of the vehicle from the self-drive unit when on the basis of camera data the artificial intelligence of the evaluation unit detects that for a predetermined period the vehicle user has been attentive. Thereafter, the vehicle user is given the option to take control of the vehicle himself and to deactivate the self-drive unit of his own volition. Here it is an advantage that the vehicle user does not have to take control of the vehicle suddenly, without realizing it. It is also advantageous that the self-drive unit only relinquishes control of the vehicle to the vehicle user when it is safe to do so and the vehicle user is not overtaxed thereby.

In another embodiment, starting from the recognition by the artificial intelligence of a predetermined emotion or that the vehicle user is inattentive, an emergency stop can be activated. In this case the emergency stop is preferably carried out if, starting from the recognition by the artificial intelligence of a predetermined emotion or that the vehicle user is inattentive, the activation of the self-drive unit fails, for example because of a defect in the self-drive unit. In such a case it is advantageous that even if the self-drive unit is defective, the vehicle will ensure a high safety level for the vehicle user.

In a further embodiment the vehicle user is identified by the artificial intelligence, so that starting from this identification, vehicle functions are adapted to suit the identified vehicle user. Such functions may be for example climate control, the electronic entertainment system, seat adjustment, mirror adjustment or lighting adjustment. Values relating to the respective vehicle functions are stored in the memory of the evaluation unit and linked to the vehicle user. When the artificial intelligence of the evaluation unit identifies the vehicle user by virtue of facial recognition, all the vehicle functions are adjusted to suit the vehicle user concerned. For that purpose the evaluation unit is connected by cable or by wireless means with the vehicle function devices and can control them. If another person uses the vehicle, then of course the vehicle function adjustments linked to that other person can be carried out. In this it is advantageous that the vehicle user no longer has to carry out the adaptations manually, or initiate the adaptations.

According to a further embodiment the vehicle comprises at least one further driver assistance system which, starting from the recognition by the artificial intelligence of a predetermined emotion or that the vehicle user is inattentive, is activated, this at least one further driver assistance system being a lane departure warning system and/or a cruise control and/or a blind-spot assist. The at least one further driver assistance system is coupled with the evaluation unit of the vehicle system, for example by cable or wireless means. Thus, the at least one further driver assistance system is controlled by the evaluation unit and activated automatically by it. In the event of a loss of attentiveness or recognized fatigue or anger, the at least one further driver assistance system is activated automatically so that in a dangerous situation it can react rapidly. This increases road safety. Needless to say, the vehicle can comprise several driver assistance systems.

For example, the lane departure warning system is automatically activated if the artificial intelligence of the evaluation unit detects inattentiveness or fatigue for a predetermined period. For example, the cruise control is activated automatically if the artificial intelligence of the evaluation unit detects inattentiveness or fatigue or anger for a predetermined period. In the event of inattentiveness or fatigue the cruise control is used in order to maintain a particular vehicle speed. In the event of anger, the cruise control is used to preclude speeds above a certain value. This can be done at the same time the lane departure warning system is activated. The blind-spot assist is activated automatically, for example if the artificial intelligence of the evaluation unit detects inattentiveness or fatigue for a predetermined period. This can also be linked to a question asked of the vehicle user whether, by way of the vehicle signal system, he has indicated a wish to drive round a bend or to change lanes.

In a further embodiment, by way of its communication device the vehicle system communicates with at least one other vehicle that also has a communication device and, if the artificial intelligence has detected inattentiveness or fatigue of the vehicle user, it emits a warning message to that vehicle. Communication between the vehicle system of the vehicle and the at least one other vehicle takes place by wireless means.

If for a predetermined period the vehicle user of the vehicle has been inattentive or, for example, angry, tired or under stress, a warning message is emitted to the at least one other vehicle. The warning message can be sent to a vehicle user of the at least one other vehicle, for example, visually, in a tactile manner or acoustically. The warning message may for example contain additional information about the user of the vehicle and/or about the vehicle itself, such as the current speed of the vehicle, the emotional state of the vehicle user, or a route planned by the vehicle user. In this context it is advantageous that the user of the at least one other vehicle can adapt his behavior to that of the user of the vehicle and, for example, drive particularly carefully if the user of the vehicle is inattentive. This increases road safety.

According to another embodiment, the camera is arranged on a steering wheel of the vehicle. The viewing angle of the camera changes in accordance with the angle to which the steering wheel has been turned. For example, the artificial intelligence of the evaluation unit calculates the recorded camera data taking into account the angle adopted, so that the image orientation does not result in errors in the evaluation of the camera data. This is advantageous in that the camera can continue viewing the face of the vehicle user at all times.

In a further embodiment the camera is arranged on a rear-view mirror, on an A-column or on a dashboard of the vehicle. In this case it is necessary for the camera to always be able to view the face of the vehicle user. The camera is arranged in such manner that it cannot be obscured.

In a process for activating a self-drive unit for autonomous driving of a vehicle having a vehicle system as already described in the description given above, the camera of the vehicle system views the face of the vehicle user and determines data. In this case the camera is arranged inside the vehicle in such manner that it is directed toward the vehicle user and can view the latter's face at all times. The camera can be arranged on a steering wheel of the vehicle, or on an A-column, a rear-view mirror or a dashboard. Of course, the camera can be arranged at some other location in the vehicle with the driver in its field of view.

The data so determined is passed on to the evaluation unit. Thus, the evaluation unit and the camera are coupled to one another, either by cable or by wireless means. The data is evaluated by the artificial intelligence of the evaluation unit in relation to the vehicle user's attentiveness and emotions. The artificial intelligence can determine a level of attentiveness of the vehicle user with reference to the direction of his line of sight and his eye movements. In addition the artificial intelligence carries out a face recognition process and can determine the vehicle user's emotions from his facial expressions. For example, the evaluation unit distinguishes between anger, happiness, surprise, anxiety, boredom, grief, revulsion, stress, fatigue and a neutral facial expression.

The evaluated data is stored in the memory, which is part of the evaluation unit. If the artificial intelligence of the evaluation unit recognizes that the vehicle user is not sufficiently attentive, or if it recognizes a predetermined emotion of the vehicle user, a warning is issued to the vehicle user. For example, in the event of anger, boredom, fatigue or anxiety a warning can be given. The warning is issued in a tactile manner and/or acoustically and/or visually. For example, the warning can be given by an electronic entertainment system of the vehicle, such that the system is coupled by cable or wireless means to the evaluation unit and can be controlled by the latter. The warning is issued if the inattentiveness or the predetermined emotion has persisted for a predetermined period.

Thereafter, if the artificial intelligence of the evaluation unit recognizes that the vehicle user's inattention or predetermined emotion still persists, the self-drive unit is activated for the autonomous driving of the vehicle. From then onward the self-drive unit has control over the vehicle. It can be activated, preferably automatically, or initiated by the vehicle user after the warning has been given. The self-drive unit is coupled to the evaluation unit by cable or wireless means.

According to an embodiment, by virtue of the data stored in the memory and evaluated, the evaluation unit generates a safety classification of the vehicle user, such that a current condition of the vehicle user is taken into account in the safety classification. Thus, the safety classification refers to the data stored in the memory and evaluated. From these evaluated and stored data a comparison databank is generated. For example, the databank can also refer to external data. On the basis of the databank the vehicle user is classified, i.e. it is determined how safely he himself can drive taking into account his attentiveness or his emotional state.

BRIEF DESCRIPTION OF THE DRAWINGS

With reference to the figures explained below, various example embodiments and details of the invention are described in more detail. The figures show.

DETAILED DESCRIPTION OF THE PREFERRED EMBODIMENTS

Figure 1:
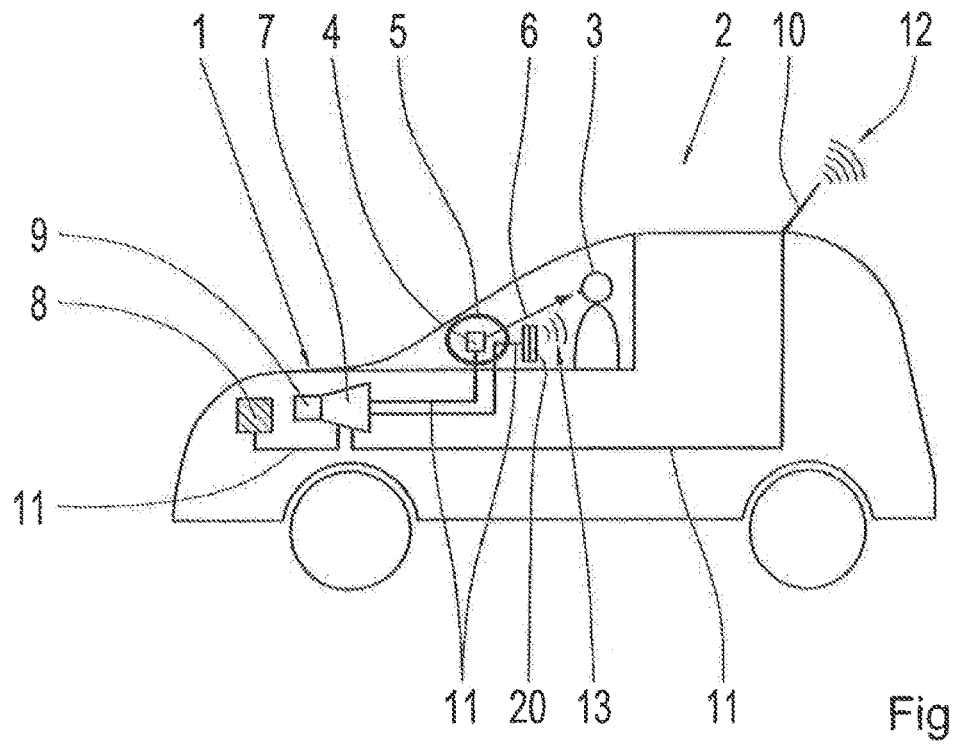
FIG. 1: A schematic overall view of a vehicle with a vehicle system according to an example embodiment.

FIG. 1 shows a schematic overall view of a vehicle 2 having a vehicle system 1 according to an example embodiment. The vehicle system 1 comprises a camera 4, an evaluation unit 7 with a memory 9, a self-drive unit 8 and a communication device 10, as well as couplings between the evaluation unit 7 and the other systems. The camera 4 is arranged inside the vehicle 2, on the steering wheel 5 of the vehicle 2. In this case the camera 4 is orientated in such manner that its line of vision 6 is directed toward the face of a vehicle user 3. During driving operation of the vehicle 2, the camera 4 focuses on the face of the vehicle user 3 at all times. The camera data generated in this way is passed on to the evaluation unit 7 by way of a coupling 11. In this case the coupling 11 can be a cable, or a wireless coupling. In addition the evaluation unit 7 is coupled to the self-drive unit 8 by way of a coupling 11, this coupling 11 again being by way of a cable or by wireless means. Furthermore the evaluation unit 7 is coupled to the communication device 10 by way of a coupling 11, this coupling 11 also being by way of a cable or by wireless means.

The vehicle comprises an electronic entertainment and diversion system 20. The system is coupled to the evaluation unit 7 by a coupling 11.

When the vehicle user 3 is driving the vehicle 2, the camera 4 views the face of the vehicle user 3 and relays the data so obtained to the evaluation unit 7. With the help of an artificial intelligence the evaluation unit 7 evaluates the camera data in relation to the attentiveness and emotion of the vehicle user 3. The evaluation by the evaluation unit 7 in relation to attentiveness and emotion makes use of a face recognition process. With reference to the facial expressions of the vehicle user 3 certain emotions of the vehicle user 3 and a level of attentiveness of the vehicle user 3 can be determined. Emotions that can be detected are, for example, happiness, anger, boredom, fatigue, stress, and also a neutral expression. If the evaluation unit 7 recognizes a certain emotion or a certain level of attentiveness, this is stored in the memory 9, which is part of the evaluation unit 7. In the memory 9 certain emotions and certain levels of attentiveness are linked to reactions of the vehicle system 1.

If, over a predetermined and fairly substantial period, the vehicle user 3 remains inattentive, tired, stressed or angry, the evaluation unit 7 for example activates the electronic entertainment system 20 and emits to the vehicle user 3 an acoustic signal 13 that alerts him to his current condition. For the vehicle user 3 this information is at the same time a warning so that he can drive more attentively. If after the output of the acoustic signal 13 the artificial intelligence of the evaluation unit 7 does not detect any change in the behavior of the vehicle user 3, then the evaluation unit 7 readies the self-drive unit 8 by way of the cable or wireless coupling 11. The self-drive unit 8 can thereafter be activated. Either the vehicle user 3 himself can activate the self-drive unit 8, or the self-drive unit 8 is activated automatically by the evaluation unit 7. When the self-drive unit 8 is active it has control over the vehicle 2 and the vehicle 2 drives autonomously. While the vehicle 2 is driving autonomously, the face of the vehicle user 3 is still viewed at all times by the camera 4.

If the emotional condition or the level of attentiveness of the vehicle user 3 changes in a positive manner and if this is detected by the artificial intelligence of the evaluation unit 7, the driver is notified that from then on he can deactivate the self-drive unit 8. Thus, road safety is substantially increased. In other words, in situations in which by virtue of emotion or owing to his attention level, the vehicle user 3 is not capable of driving the vehicle 2 safely, he can turn control over to the self-drive unit 8 which can drive the vehicle 2 more safely. When the vehicle user 3 is again sufficiently attentive to drive the vehicle 2 safely, or when he has reached an emotional condition in which he can drive the vehicle 2 safely, only then is the vehicle user 3 offered the option to take back control of the vehicle 2 again from the self-drive unit 8. The vehicle user 3 has to take control of the vehicle 2 deliberately. This avoids the possibility that the vehicle 2 is taken over by the vehicle user 3 too suddenly, without being ready for it.

Thus, if the artificial intelligence of the evaluation unit 7 detects that the vehicle user 3 is in an emotional state in which he can no longer drive the vehicle 2 safely, or that the vehicle user 3 is inattentive so that, again, he can no longer drive the vehicle 2 safely, a signal 12 is sent by the communication device 10 to other vehicles which also have communication devices. The information to be transmitted by the signal 12 is relayed by the evaluation unit 7 to the communication device 10 by way of a coupling 11. This provision of information to other vehicles has the advantage that the vehicle users of the other vehicles can adapt their driving to the behavior of the vehicle user 3 and, for example, drive particularly carefully.

By way of the electronic entertainment system 20 diversionary recommendations can also be made to the vehicle user 3, which improve or assist his current emotional condition. For example, if the vehicle user 3 is bored, the electronic entertainment system 20 can play music to make the vehicle user 3 less bored.

Figure 2:
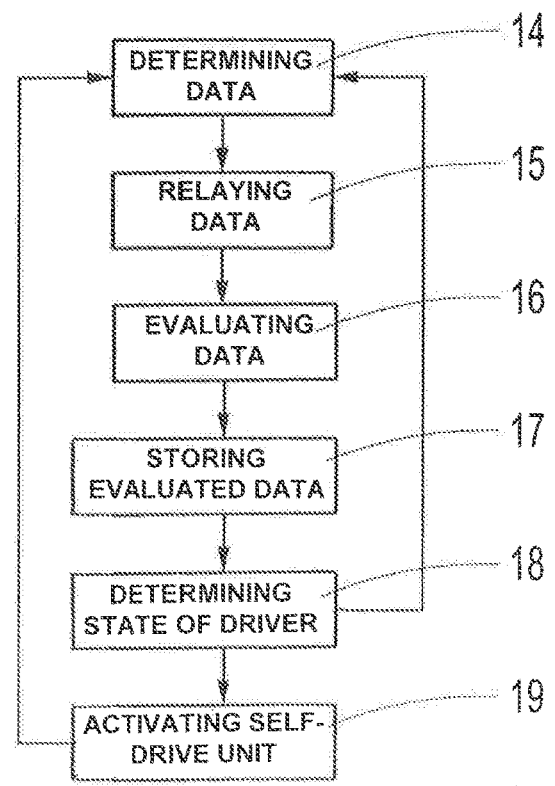
FIG. 2: A process diagram according to an example embodiment.

FIG. 2 shows a process diagram according to an example embodiment. A process 21 is shown, for activating the self-drive unit 8 for the autonomous driving of the vehicle having the vehicle system. Six process steps 14, 15, 16, 17, 18 and 19 are shown. In the first process step 14 the camera of the vehicle system is viewing the vehicle user's face continually and thereby determining camera data. In the second process step 15 the camera data determined are relayed to the evaluation unit of the vehicle system. This transfer can take place either by wireless means or by way of a cable.

In the third process step 16, with the help of the artificial intelligence the camera data is evaluated by the evaluation unit in relation to the attentiveness and emotions of the vehicle user. Depending on the arrangement of the camera inside the vehicle it may be necessary, first, to re-orientate the image data from the camera. For example, if the camera is arranged on a steering wheel of the vehicle, the image orientation of the camera has to be recalculated so as to reduce the probability of error in relation to the evaluation by the evaluation unit. The artificial intelligence of the evaluation unit can determine a level of attentiveness of the vehicle user, for example from the direction of his line of sight or from his eye movements. In addition the artificial intelligence carries out a face recognition process and, from the vehicle user's facial expressions, determines his current emotions.

In a fourth process step 17, the evaluated data is stored in the memory of the evaluation unit. Thus, the evaluation unit can also determine an emotional or an attentiveness variation of the vehicle user. In a fifth process step 18, the artificial intelligence of the evaluation unit determines whether the vehicle user has remained inattentive or has shown a predetermined emotion, such as anger, stress or fatigue, for a predetermined period. If the vehicle user is sufficiently attentive and/or shows no stress and/or no fatigue and/or no anger, the process 21 is repeated from the first process step 14. But if the artificial intelligence recognizes that the vehicle user is not sufficiently attentive or is stressed, tired or angry, and this has persisted for a predetermined period, a warning is issued to the vehicle user. If after a warning has been given the level of attentiveness and/or the emotions of the vehicle user do not change, or if they deteriorate still further, then the self-drive unit of the vehicle system is activated by the evaluation unit of the vehicle system. This is the sixth and last process step 19. When the self-drive unit is activated is has control over the vehicle. Thus, the vehicle user no longer has any influence on the vehicle. Accordingly, the vehicle is driving autonomously.

While the self-drive unit is active, the camera still views the face of the vehicle user continuously and relays the camera data so obtained to the evaluation unit. In other words, the process sequence from the first process step 14 is reiterated. If it is found that the attentiveness of the vehicle user has improved and/or that the emotional condition of the vehicle user has changed, so that the vehicle user can once more drive the vehicle safely, the vehicle user is offered the option of deactivating the self-drive unit and again himself taking control of the vehicle.

The examples described herein have been chosen only as examples. For instance, instead of on the steering wheel the camera of the vehicle system can be arranged on the rear-view mirror, on the A-column or on the dashboard of the vehicle, and in such cases the camera is permanently directed at the face of the vehicle user. Furthermore, the vehicle system can for example be coupled to a blind-spot assist or a lane departure warning system and can control these other driver assistance systems if certain emotional conditions or a certain level of attentiveness are detected by the artificial intelligence. In addition the emotional condition of other vehicle users present in the same vehicle can be reacted to. For this, the camera views the faces of the other vehicle users and sends these data to the evaluation unit, where they are evaluated by the artificial intelligence. For example, if it is found that another vehicle user is not happy, the evaluation unit can activate the electronic entertainment system and, perhaps, play some music. However the other vehicle users, who are not driving the vehicle, have no influence on the activation of the self-drive unit.

INDEXES

1 Vehicle system
2 Vehicle
3 Vehicle user
4 Camera
5 Steering wheel
6 Camera line of sight
7 Evaluation unit
8 Self-drive unit
9 Memory
10 Communication device
11 Coupling
12 Signal
13 Acoustic signal
14 First process step
15 Second process step
16 Third process step
17 Fourth process step
18 Fifth process step
19 Sixth process step
20 Entertainment and diversion system
21 Process

The invention claimed is:

1. A vehicle system of a vehicle for at least one vehicle user, the vehicle system comprising:
   a camera arranged inside the vehicle,
   an evaluation unit comprising a memory, and the evaluation unit being coupled to the camera,
   a communication device being coupled to the evaluation unit,
   a self-drive unit being coupled to the evaluation unit and by which the vehicle is autonomously driveable,
   the camera being directed toward the vehicle user for viewing a face of the vehicle user and relaying data to the evaluation unit,
   the evaluation unit evaluating, by artificial intelligence, the data from the camera in relation to attentiveness and an emotion of the vehicle user while the vehicle is controlled by the vehicle user, the evaluated data being stored in the memory of the evaluation unit, on a basis of either a predetermined emotion, recognized by the artificial intelligence, or a lack of attentiveness of the vehicle user, recognized by the artificial intelligence while the vehicle is controlled by the vehicle user, the vehicle user is notified of the emotion or inattentiveness recognized and the self-drive unit only being activated to take control of the vehicle from the vehicle user when either the emotion or the lack of attentiveness of the vehicle user persists for a predetermined period of time, and an emergency stop being actuated, while the vehicle is controlled by the vehicle user, to carry out an emergency stop of the vehicle when activation of the self-drive unit fails, wherein the evaluation unit of the vehicle system is coupled to an electronic entertainment system, the electronic entertainment system is present in the vehicle, and the electronic entertainment system is activated on the basis of either the predetermined emotion recognized by the artificial intelligence or the lack of attentiveness of the vehicle user recognized by the artificial intelligence, the electronic entertainment system comprising a plurality of different types of media, and the electronic entertainment system being activated to play a specific type of media based on the predetermined emotion recognized by the artificial intelligence from a plurality of predetermined emotions stored in the memory of the evaluation unit, and if the predetermined emotion recognized by the artificial intelligence is bored and the vehicle is being driven by the self-drive unit, the electronic entertainment system is activated to play a film.

2. The vehicle system according to claim 1, wherein on the basis of one of the inattentiveness recognized by the artificial intelligence, a recognized stress and a recognized fatigue of the vehicle user, a warning is issued to the vehicle user.

3. The vehicle system according to claim 1, wherein on the basis of attentiveness of the vehicle user recognized by the artificial intelligence, the self-drive unit is deactivated.

4. The vehicle system according to claim 1, wherein the vehicle user is identified by the artificial intelligence, and based on the vehicle user identification, a function of an electronic entertainment system is adapted to suit the vehicle user identified.

5. The vehicle system according to claim 1, wherein the vehicle comprises at least one further driver assistance system which is activated on the basis of either the predetermined emotion, recognized by the artificial intelligence, or the lack of attentiveness of the vehicle user, recognized by the artificial intelligence, and the at least one further driver assistance system being at least one of a lane departure warning system, a speed regulation unit and a blind-spot assist.

6. The vehicle system according to claim 1, wherein the camera is arranged on a steering wheel of the vehicle and is continually directed to view the face of the vehicle user, and the camera continually relaying the data to the evaluation unit while the vehicle is controlled by the vehicle user.

7. The vehicle system according to claim 1, wherein the camera is arranged on one of a rear-view mirror, an A-column and a dashboard of the vehicle and is continually directed to view the face of the vehicle user, and the camera continually relaying the data to the evaluation unit.

8. A vehicle system of a vehicle for at least one vehicle user, the vehicle system comprising:

a camera arranged inside the vehicle, an evaluation unit comprising a memory, and the evaluation unit being coupled to the camera, a communication device being coupled to the evaluation unit, a self-drive unit being coupled to the evaluation unit and by which the vehicle is autonomously driveable, the camera being directed toward the vehicle user for viewing a face of the vehicle user and relaying data to the evaluation unit, the evaluation unit evaluating, by artificial intelligence, the data from the camera in relation to attentiveness and an emotion of the vehicle user while the vehicle is controlled by the vehicle user, the evaluated data being stored in the memory of the evaluation unit, on a basis of either a predetermined emotion, recognized by the artificial intelligence, or a lack of attentiveness of the vehicle user, recognized by the artificial intelligence while the vehicle is controlled by the vehicle user, the vehicle user is notified of the emotion or inattentiveness recognized and the self-drive unit only being activated to take control of the vehicle from the vehicle user when either the emotion or the lack of attentiveness of the vehicle user persists for a predetermined period of time, and an emergency stop being actuated, while the vehicle is controlled by the vehicle user, to carryout an emergency stop of the vehicle when activation of the self-drive unit fails, wherein the vehicle system communicates, via the communication device, with at least one other vehicle which has its own communication device, and on the basis of either the predetermined emotion or the lack of attentiveness of the vehicle user recognized by the artificial intelligence, the communication device of the vehicle system emits a warning message to the at least one other vehicle, the warning message comprising information about an emotional state of the vehicle user such that a driving behavior of a driver of the other vehicle can be adapted to increase road safety.

9. A process of activating a self-drive unit for autonomous driving of a vehicle having a vehicle system that includes a camera arranged inside the vehicle and directed toward a vehicle user, an evaluation unit having a memory, the evaluation unit being coupled to the camera, a communication device being coupled to the evaluation unit, a self-drive unit, being coupled to the evaluation unit and by which the vehicle being autonomously driveable, the method comprising:

viewing and determining data of a face of the vehicle user with the camera of the vehicle system, relaying the determined data to the evaluation unit of the vehicle system, while the vehicle is controlled by the vehicle user, evaluating the determined data with an artificial intelligence of the evaluation unit to confirm an identity of the vehicle user and determine a predominant emotion of the vehicle user while the vehicle is controlled by the vehicle user, storing the evaluated data in the memory of the evaluation unit, issuing a warning to the vehicle user, while the vehicle is controlled by the vehicle user, if the artificial intelligence of the evaluation unit recognizes either a lack of attentiveness or a predetermined emotion of the vehicle user, only activating the self-drive unit of the vehicle system, for autonomous driving, while the vehicle is controlled by the vehicle user to take control of the vehicle from the vehicle user if the artificial intelligence of the evaluation unit recognizes that either the lack of attentiveness or the predetermined emotion of the vehicle user is persisting for a predetermined period of time, and actuating an emergency stop of the vehicle, while the vehicle is controlled by the vehicle user, when activation of the self-drive unit for autonomous driving of the vehicle fails, recognizing, with the artificial intelligence, the predetermined emotion of the vehicle user by comparing the emotion of the vehicle user with a plurality of predetermined emotions stored in the memory, and each of the plurality of predetermined emotions being linked to a respective specific type of media, and activating an electronic entertainment system, which is coupled to the evaluation unit, to play a film when the predetermined emotion of the vehicle user that is recognized by the artificial intelligence is bored and the vehicle is being autonomously driven by the self-drive unit.

10. The process according to claim 9, further comprising generating, via the evaluation unit, a safety classification of the vehicle user with reference to the data stored and evaluated in the memory, such that a current condition of the vehicle user is taken into account in the safety classification.

11. A vehicle system of a vehicle, the vehicle system comprising:

a camera being arranged inside the vehicle and directed at a face of a vehicle driver for collecting data, an evaluation unit being coupled to the camera such that the data collected by the camera is received by the evaluation unit, the evaluation unit having an artificial intelligence for evaluating the collected data from the camera in relation to an emotion of the vehicle driver, and the evaluation unit having a memory in which the evaluated data are stored, a communication device being coupled to the evaluation unit, a self-drive unit being coupled to the evaluation unit and being activatable by the evaluation unit to autonomously drive the vehicle when a predetermined emotion of the vehicle driver is recognized by the artificial intelligence, and the self-drive unit being activated and the vehicle driver being notified of the emotion recognized, an emergency stop being actuated to carry out an emergency stopping of the vehicle when activation of the self-drive unit fails, the evaluation unit being coupled to an electronic entertainment system that is present in the vehicle, the artificial intelligence determining the predetermined emotion of the vehicle driver by comparing the emotion of the vehicle user with a plurality of predetermined emotions stored in the memory of the evaluation unit, and the electronic entertainment system comprising a plurality of types of media, and each of the plurality of types of media being linked to a respective one of the plurality of predetermined emotions, and the electronic entertainment system being activated by the evaluation unit to play a film when the predetermined emotion that is recognized by the artificial intelligence is bored and the vehicle is being autonomously driven by the self-drive unit.

* * * * *